United States Patent
Kim et al.

(10) Patent No.: US 8,438,195 B2
(45) Date of Patent: May 7, 2013

(54) FILE SYSTEM OPERATING METHOD AND DEVICES USING THE SAME

(75) Inventors: Jae Geuk Kim, Hwaseong-si (KR); Chul Lee, Suwon-si (KR); Joo Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/304,579

(22) Filed: Nov. 25, 2011

(65) Prior Publication Data
US 2012/0209893 A1 Aug. 16, 2012

(30) Foreign Application Priority Data
Feb. 15, 2011 (KR) .................. 10-2011-0013272

(51) Int. Cl.
*G06F 7/00* (2006.01)

(52) U.S. Cl.
USPC ......................... 707/822; 707/825

(58) Field of Classification Search .............. 707/822, 707/825
See application file for complete search history.

(56) References Cited

U.S. PATENT DOCUMENTS

| 7,363,420 | B2 | 4/2008 | Lin et al. | |
|---|---|---|---|---|
| 2006/0004957 | A1* | 1/2006 | Hand et al. | 711/113 |
| 2011/0035548 | A1* | 2/2011 | Kimmel et al. | 711/114 |

FOREIGN PATENT DOCUMENTS

| JP | 2007-133683 | | 5/2007 |
|---|---|---|---|
| KR | 1020080033649 | A | 4/2008 |
| KR | 1020090017238 | A | 2/2009 |

* cited by examiner

*Primary Examiner* — Jensen Hu
(74) *Attorney, Agent, or Firm* — Volentine & Whitt, PLLC

(57) ABSTRACT

A method of operating a file system in a host configured to store write data in a data storage device including a first region and a second region is disclosed, and includes; receiving a write data request for write data associated with a file, classifying the write data as hot data or cold data using file meta data for the file, and if the write data is classified as hot data, storing the write data in the first region, and otherwise if the write data is classified as cold data storing the write data in the second region.

20 Claims, 8 Drawing Sheets

FILE SYSTEM OPERATING METHOD AND DEVICES USING THE SAME

CROSS-REFERENCE TO RELATED APPLICATIONS

This application claims priority under 35 U.S.C. §119(a) from Korean Patent Application No. 10-2011-0013272 filed on Feb. 15, 2011, the subject matter of which is hereby incorporated by reference.

BACKGROUND OF THE INVENTION

The present inventive concept relates to file systems and methods of operating file systems to store data within a data storage system. More particularly, the inventive concept is related to a file system management method within a host that is capable of improving performance of the data storage system by classifying data as hot data or cold data using file meta data.

Many host devices operating in conjunction with related data storage devices use a file system to create and organize files as well as data associated with the files. In essence, the file system performs various operations the enable data to the stored and accessed in an efficient manner. When performance of a file system is low, the number and frequency of constituent operations will increase. This may cause increased power consumption by the data storage device and decrease in system availability. Accordingly, it is necessary to improve performance of the file system.

SUMMARY OF THE INVENTION

One embodiment of the inventive concept is directed to a method of operating a file system in a host configured to store write data in a data storage device including a first region and a second region, the method comprising; receiving a write data request for write data associated with a file, classifying the write data as hot data or cold data using file meta data for the file, and if the write data is classified as hot data, storing the write data in the first region, and otherwise if the write data is classified as cold data storing the write data in the second region.

Another embodiment of the inventive concept is directed to a host in a data storage system being connected to a data storage device. The host comprise; a user application generating a write data request to write data associated with a file, and a file system configured to receive the write data request, classify the write data as hot data or cold data using file meta data associated with the file, and if the write data is classified as hot data, storing the write data in a first region of the data storage device, and otherwise if the write data is classified as cold data storing the write data in a second region of the data storage device.

Another embodiment of the inventive concept is directed to a memory system, comprising; a data storage device including a first region and a second region, and a host connected to a data storage device, wherein the host comprises a user application generating a write data request to write data associated with a file, and a file system configured to receive the write data request, classify the write data as hot data or cold data using file meta data associated with the file, and if the write data is classified as hot data, storing the write data in the first region, and otherwise if the write data is classified as cold data storing the write data in the second region.

BRIEF DESCRIPTION OF THE DRAWINGS

These and/or other aspects and advantages of the inventive concept will become apparent and more readily appreciated from the following description of the embodiments, taken in conjunction with the accompanying drawings of which.

DETAILED DESCRIPTION

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
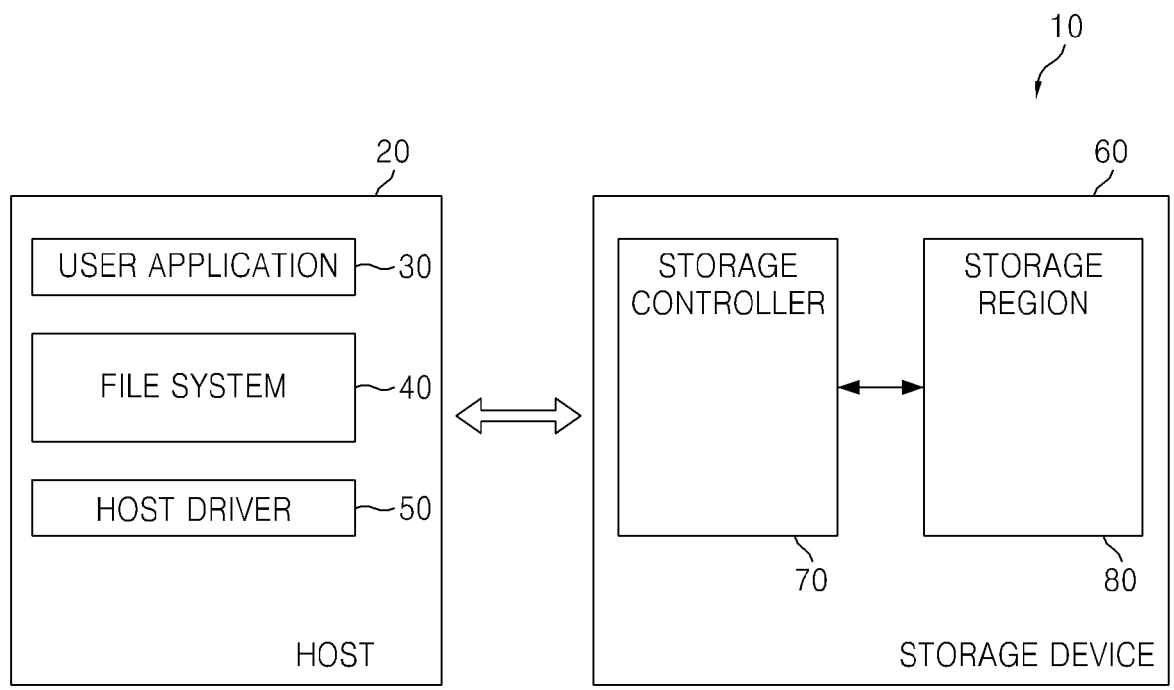
FIG. 1 is a block diagram of a data storage system including a host according to an embodiment of the inventive concept.
Figure 2:
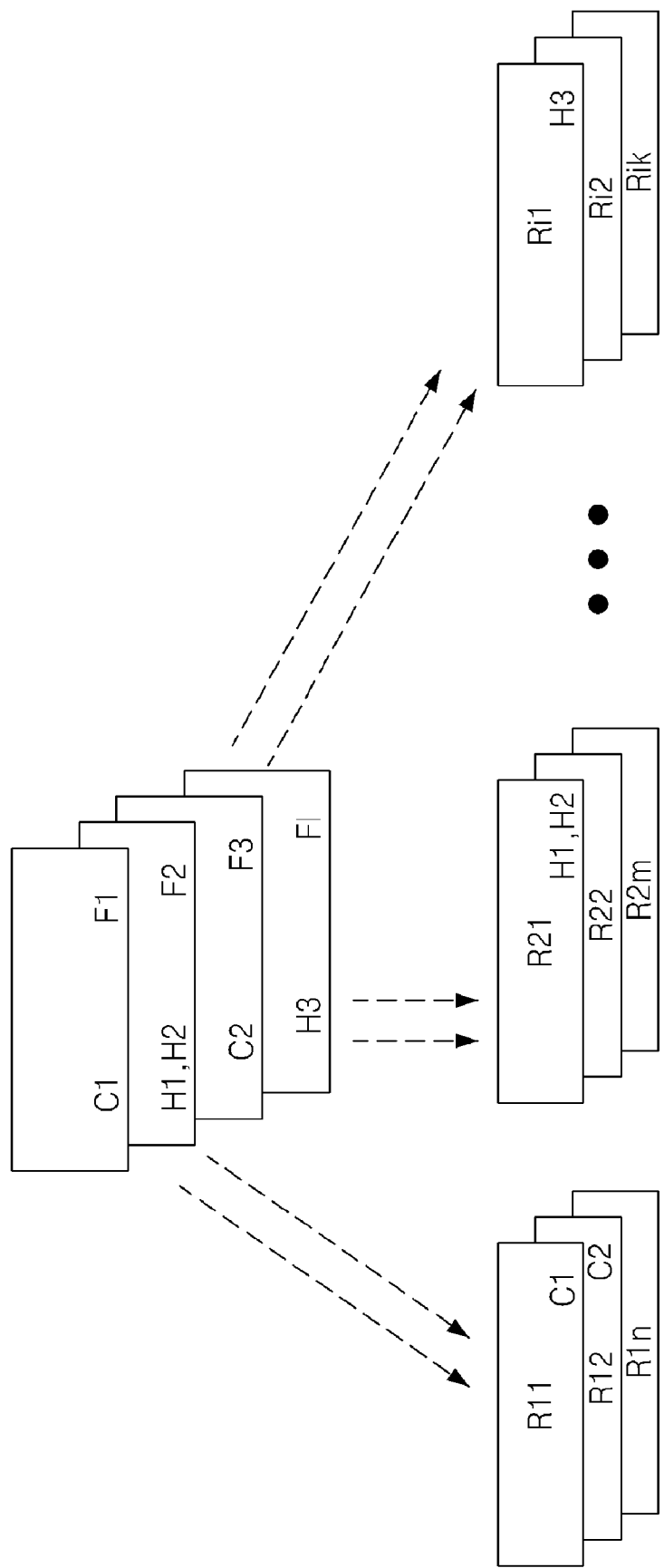
FIG. 2 is a diagram further illustrating the file system of the host of FIG. 1.

FIG. 1 is a general block diagram of a data storage system including a host 20 connected to a data storage device 60 according to an embodiment of the inventive concept. FIG. 2 is a conceptual diagram further illustrating a management method for a file system within the host 20 of FIG. 1.

Referring to FIGS. 1 and 2, the data storage system 10 comprises the host 20 and data storage device 60 connected via a wireless and/or hardwired data communication channel. The host 20 controls the overall operation of the data storage device 60 by sending commands or instructions (e.g., by communicating defined control signals and/or data commands) to a storage controller 70 within data storage device 60. In response to the commands/instructions received from the host 20, the data storage device 60 performs various operations (e.g., write (or program), read and erase operations) related to "write data" (i.e., data to be written to the storage region 80 of the data storage device 60) or "read data" (data to be retrieved from the storage region 80).

As is typical, the host 20 illustrated in FIG. 1 operates in accordance with various interrelated software components, such as a user application 30, a file system 40 and a host driver 50. In general, during execution of the user application 30, file access requests will be made related to data stored in the storage device 60. Such file access requests are made in relation to previously created data structures generally referred to as "files". During its execution, the user application 30 may create, name (rename), modify, and/or delete a file as well as one or more directories indexing the file. Such actions by the user application 30 necessarily result in the operation of the file system 40 which is the primary resource managing the creation, modification and deletion and organization of various files established by the host 20. The file system 40 may also serve as the interface between the user application 30 and various host drivers 50 that effect the actual manipulation (e.g., reading, writing and erasing) of data within the data storage device 60 as the result of user application execution.

For example, referring to FIG. 2, the file system 40 may create and organize a plurality of files (e.g., F1, F2, F3, . . . , FI) and data (e.g., C1, H1, H2, C2 and H3) related to the plurality of files. Thus, in its operation, the file system 40 regards the data storage device 60 as a logical volume including a defined set of files and directories. Various methods and techniques may be used to implement, organize and administer the plurality of files and related data established by the file system 40. For example, the file system 40 may use a file allocation table (FAT) (e.g., a conventionally understood approach such as FAT32 or exFAT). Alternately or additionally, the file system 40 may use the so-called new technology file system (NTFS) or ext2/3/4 which are also conventionally understood.

When the user application 30 causes data to be written (i.e., creates write data), such as C1, H1, H2, C2 or H3 in the illustrated example of FIGS. 1 and 2, in relation to a defined file (e.g., F1, F2, F3, . . . , and FI), the file system 40 generates one or more command(s)/request(s) associated with the data. In the illustrated example of FIGS. 1 and 2, the file F1, F2, F3, . . . , and FI are constructed around the data C1, H1, H2, C2 or H3.

In addition to user application defined data, each one of the plurality of files F1, F2, F3, . . . , and FI includes so-called file meta information. File meta information is essentially information that uniquely identifies and allows manipulation of and interrelationship between each one of the plurality of file F1, F2, F3, . . . , and FI. File meta information takes many different forms, but usually includes such information as file size, a file offset (i.e., a location index), a file ID, a parent ID, a file name and a parent name. Since the file meta information is expressed according to one or more established data formats is often referred to simply as "file meta data".

A great deal of data may be implicated in the execution of any given user application 30 or related host functionality (e.g., its operating system or OS). Yet, all of this implicated data is not the same. Some data is quite frequently accessed during execution of the user application 30, while other data is rarely accessed, if ever. Hence, any particular grouping of file data (e.g., C1, H1, H2, C2 and H3) may be arbitrarily classified as "hot data" or "cold data" according to its frequency of access. For example, hot data may be defined as data that is accessed about 90% of the time during a particular user application (or host functionality) and cold data may be defined as data that is access about 10% of the time. The file system 40 of the host 20 may be used to make this classification between hot data and cold data. Further, a hot/cold data indicator may be included within the relevant file meta data.

A determination of whether data should be classified as hot or cold may be made, at least in part, in relation to different types of data operations. For example, the file system 40 may use existing file meta data to decide whether a particular data access requires the update of existing file data or an appending of data to the existing file data. Such a determination will usually be made in relation to the size of the data being accessed and the current memory allocation for the file. Where the existing memory allocation for a file is adequate to allow inclusion of data being written, for example, the file need only be updated. However, where the existing memory allocation is inadequate the implicated data must be appended.

So, referring again to FIG. 2, when data H1, H2 (or H3) updates the file F2 (or FI), the file system 40 classifies the data H1, H2 (or H3) as hot data, but when appending the data C1 (or C2) to the file F1 (or F3), the file system 40 classifies the data C1 (or C2) as cold data. And when the data C1 (or C2) is classified as cold data, the file system 40 will cause the data C1 (or C2) to be stored in a cold data region (e.g., R11 or R12) of the storage region 80 of the data storage device 60. Analogously, when the data H1, H2 (or H3) is classified as hot data, the file system 40 will cause the data H1, H2 (or H3) to be stored in a hot data region (e.g., R21 or Ri1) of the storage region 80.

From the standpoint of the file system 40, each one of the available plurality of data storage regions (e.g., R11, R12, . . . , and Rik) is seen as a different logical volume. For example, when the file system 40 implements a log structured file system, each of the plurality of regions (e.g., R11, R12, . . . , and Rik) may be recognized as a log.

Thus, within the context of various embodiments of the inventive concept, the host 20 (and particularly the file system 40 of the host 20) may improve overall performance of the storage system 10 by classifying data as hot data or cold data as it is stored in relation to different regions within the data storage region 80.

For example, continuing with the foregoing example, the file system 40 classifies as cold data both C1 and C2 related respectively to files F1 and F3. This cold data classification may be made using the file meta data (e.g., a file ID, a parent ID, a file name or a parent name). Hence, the file system 40 stores data C1 belonging to the file F1 in one cold data region R11, and the file system 40 stores data C2 belonging to the file F3 in another cold data region R12. Likewise, the file system 40 may classify data H1, H2 and H3 related respectively to files F2 and FI as hot data using the file meta data and store same in the identified hot data regions R21 and Ri1. In this manner, the file system 40 prevents hot data related to certain files from being mixed with cold data related to different files using, for example, different logs.

According to another embodiment, the file system 40 may further classify hot data (or cold data) according to additional degrees of distinction. For example, using available update frequency data, the file system may distinguish hot data from "very hot data" (or cold data from "very cold data") and assign respective data storage regions accordingly. Such further distinction according to data access frequency may continue to its practical conclusion according to system type, host functionality, and file system capabilities.

The various host driver(s) 50 function to convert file system commands and operations into actual data storage device command/instructions. For example, the host driver 50 effects the communication of a write command, corresponding write data, and related write data addresses to the data storage device 60. The write data addresses will define the actual regions to which the write data will be written. The host driver 50 may also add certain communication protocol information necessary to communicate with the storage device 60. Various types of communication channels (e.g., data buses) may be used to transmit data between the host 20 and storage device 60.

The storage device 60 of FIG. 1 comprises the storage controller 70 and the storage region 80. The storage controller 70 controls to writing of data to (and the reading of data from) the storage region 80. That is, the storage controller 70 defines the write operations and read operations executed by the storage region 80. The storage region 80 may include volatile or non-volatile memory.

When the storage region 80 includes flash memory, the storage controller 70 will typically include a flash transition layer FTL that maps logical addresses provided by the host 20 into corresponding physical addresses of the storage region 80.

Figure 3:
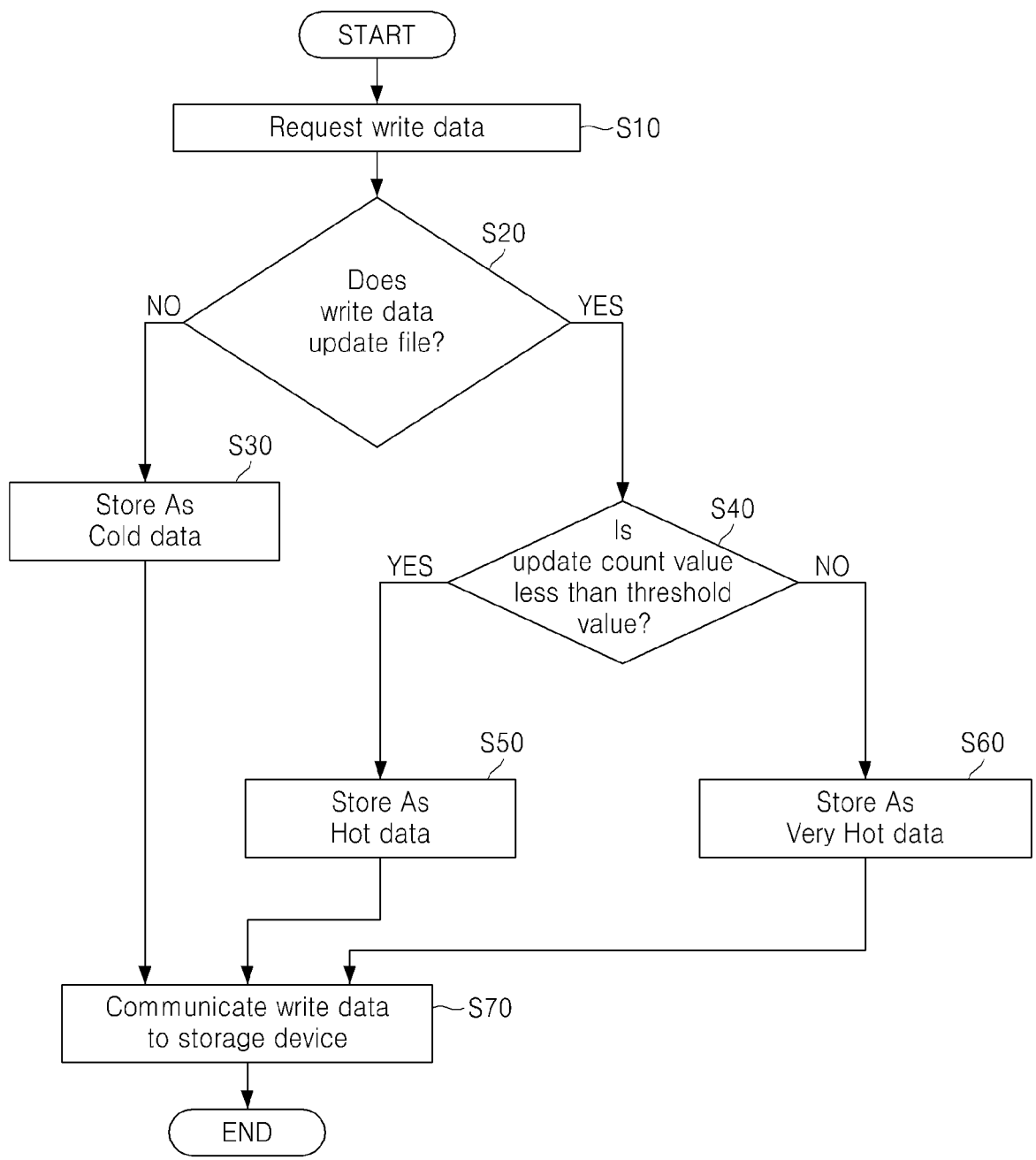
FIG. 3 is a flowchart summarizing one possible method of operation for the host illustrated in FIG. 1.
Figure 4:
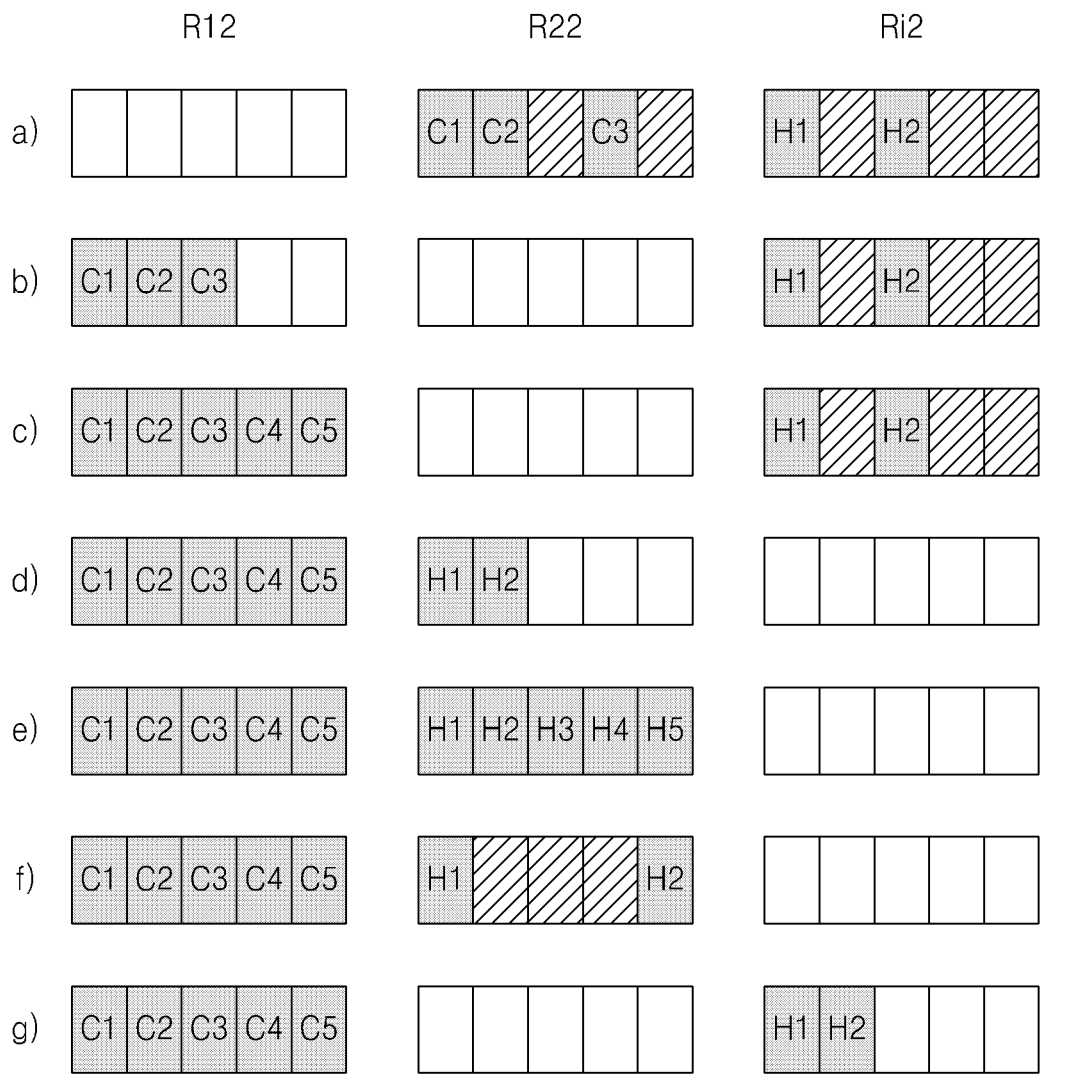
FIGS. 4A to 4G are diagrams illustrating use of a cleaner process by the file system of the host of FIG. 1.

FIG. 3 is a flowchart summarizing one possible method of operation for the storage system 10 of FIG. 1. Referring to FIGS. 1 to 3, the user application 30 transmits a request for write data (e.g., C1, H1, H2, C2 or H3) related to files F1, F2, F3, . . . , and FI) using the file system 40 (S10). The file system 40 then determines with reference to the file meta data whether the requested write data updates the corresponding file or appends the corresponding file (S20). When the write data is appended to the corresponding file (S20=NO), the file system 40 classifies the write data as cold data (S30).

However, when the write data updates the corresponding file (S20=YES), the file system 40 determines, with reference to update history information, whether update data for the write data is less than a defined threshold value (S40). For example, the update history may indicate a number of times that the particular write data has been updated during a defined period of time (i.e., an update count). This update count value may be compared to a threshold value to distinguish hot data from very hot data, for example. That is, when the update count value for write data is less than the threshold value (S40=YES), the write data is stored as hot data in a corresponding hot data region (S50). However, when the update count value for write data is not less than the threshold value (S40=NO), the write data is stored as very hot data in a corresponding very hot data region (S60).

Once a particular write data has been classified as cold data, hot data, or very hot data according to the foregoing method, it may be communicated to the data storage device using an appropriate write command (S70).

Drawing further upon the example of FIGS. 1 through 3, FIGS. 4A to 4G are conceptual diagrams further illustrating a write data classification method and memory management approach according to an embodiment of the inventive concept. Referring to FIGS. 1 through 4G it is assumed that the file system 40 is a log-structured file system. The file system 40 should ensure that a maximum practical amount of free memory space is available for writing new write data during operation of the memory system. In FIGS. 4A through 4G, free memory space is indicated as "logs" (e.g., R12, R22 and Ri2). Each of the logs R12, R22 and Ri2 includes a plurality of data pages adapted to store data.

Referring to FIG. 4A, it is initially assumed that cold data C1, C2 and C3 are stored in log R22 and the hot data H1 and H2 are stored in log Ri2. Log R12 is empty.

Then when the file system 40 seeks to sequentially store new data C4 and C5, both classified as cold data, in the log R22, it is noted that log R22 does not have sufficient free space. Accordingly, a "cleaner process" is required. The cleaner process effectively reallocates memory space in an efficient manner by re-grouping and/or compressing valid data using available logs, and/or deleting invalid data.

For example, referring to FIGS. 4B and 4C, the file system 40 moves data C1, C2 and C3 stored in a log R22 to log R12, and then appends new data C4 and C5 to the log R12. In similar manner and referring to FIGS. 4D and 4E, when the file system 40 seeks to store new hot data H3, H4 and H5, the cleaner process moves valid hot data H1 and H2 previously stored in log Ri2 to the log R22 and then adds new data H3, H4 and H5, also classified as hot data to log R22. In this manner, the log Ri2 become free memory space.

Referring to FIG. 4F, data H2, H3 and H4 are now indicated as no longer (or "invalid") data. Referring to FIG. 4G, the cleaner process is performed to move still valid hot data H1 and H2 from the log R22 to the log Ri2, thereby freeing up the entirety of the log R22. Thus, in certain embodiments of the inventive concept, a constituent cleaner process used to manage memory space will take into account designated "hot data" regions and "cold data" regions.

Figure 5:
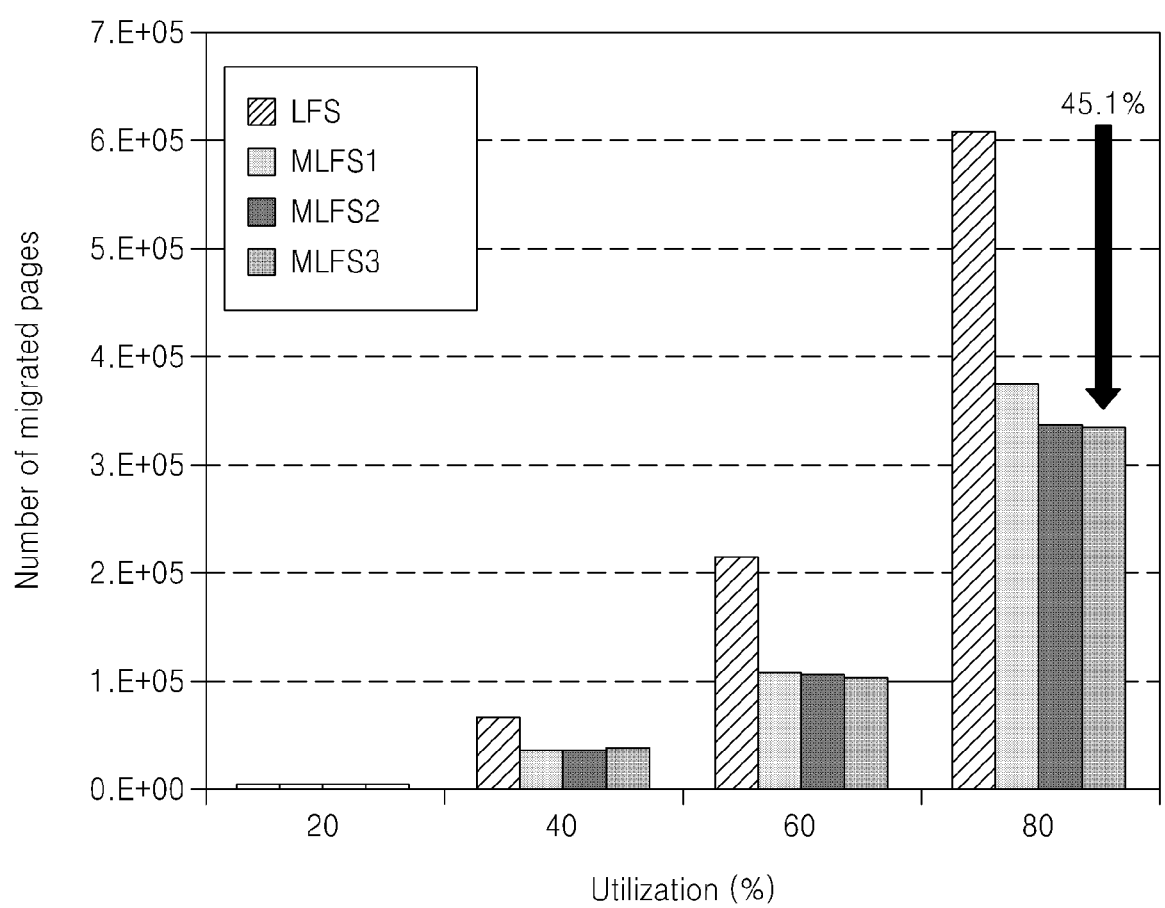
FIG. 5 graphically illustrates a simulation result for a cleaned process according to an operation of the host illustrated in FIG. 1.

FIG. 5 graphically illustrates a simulation result for application of a cleaner process within the memory management of the memory system 10 of FIG. 1. Referring to FIGS. 1 to 5, the file system 40 is assumed to be a log structured file system.

LFS depicts a simulation result for the cleaner process when storing data in a log without classifying it as hot/cold. Whereas each of MLFS1, MLFS2 and MLFS3 depicts a simulation result for the cleaner process when classifying between hot data and cold data and storing each in a different log. MLFS1 includes logs R11 and R21. A log R11 is a log for storing cold data. A log R21 is a log for storing hot data.

MLFS2 includes logs R11, R21 and Ri1. A log R11 is a log for storing cold data. Logs R21 and Ri1 are logs for storing hot data. MLFS3 includes logs R11, R21, R22, . . . , and R2$m$, and Ri1. A log R11 is a log for storing cold data. Logs R21, R22, . . . , and R2$m$ are logs for storing hot data.

A log Ri1 is a log for storing hot data accessed more frequently than the hot data.

The x axis of FIG. 5 indicates utilization depicting valid data and the y axis is the number of migrated pages by a cleaner processor. Referring to FIG. 5, when the utilization is 80%, it is known that cleaning overhead of MLF2 decreases 45.1% against LFS.

Figure 6:
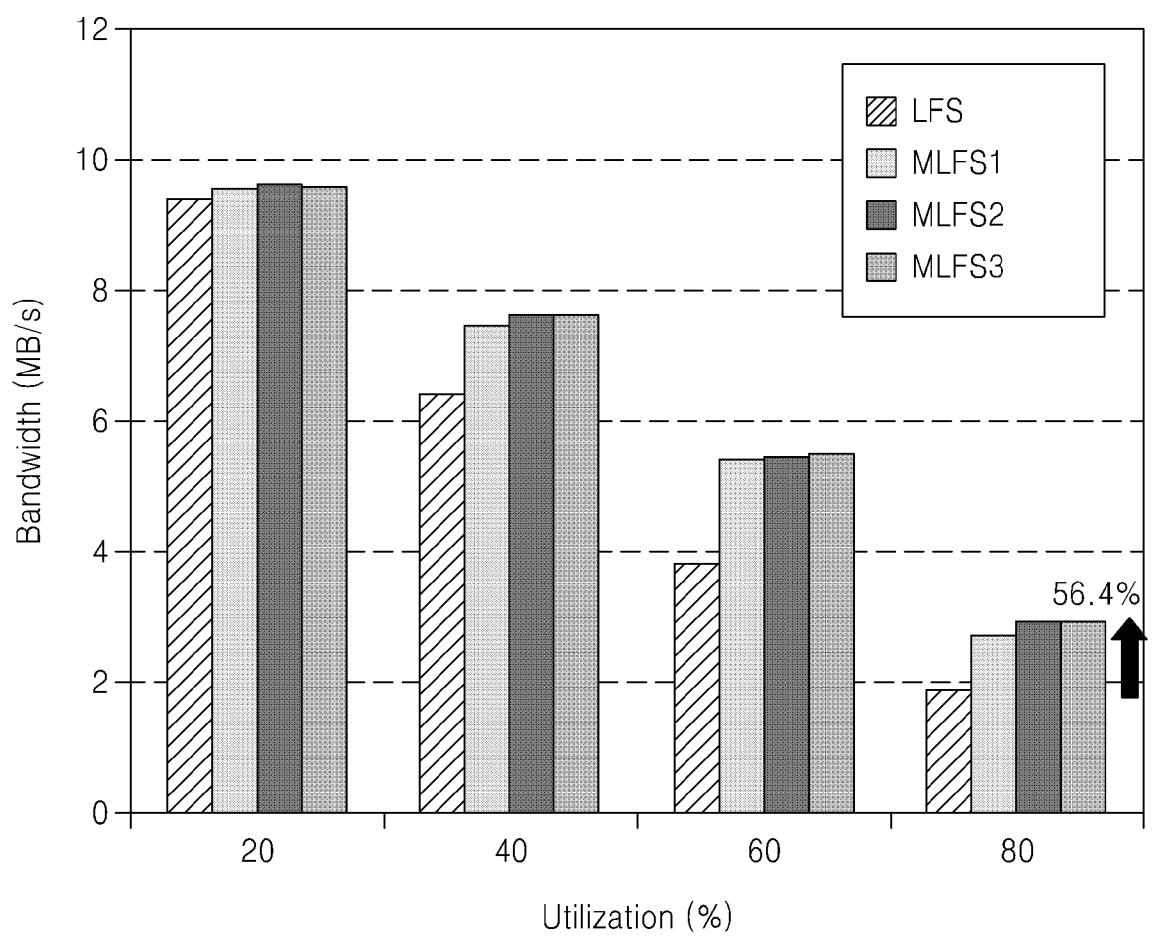
FIG. 6 graphically illustrates another simulation result for system performance according to operation of the host illustrated in FIG. 1.

FIG. 6 graphically illustrates a simulation result for application of a cleaner process within the memory management of the memory system 10 of FIG. 1. The x axis of FIG. 6 is utilization depicting valid data and the y axis is bandwidth. Referring to FIG. 6, when the utilization is 80%, it is known that system performance of MLF3 increases 56.4% against LFS.

Figure 7:
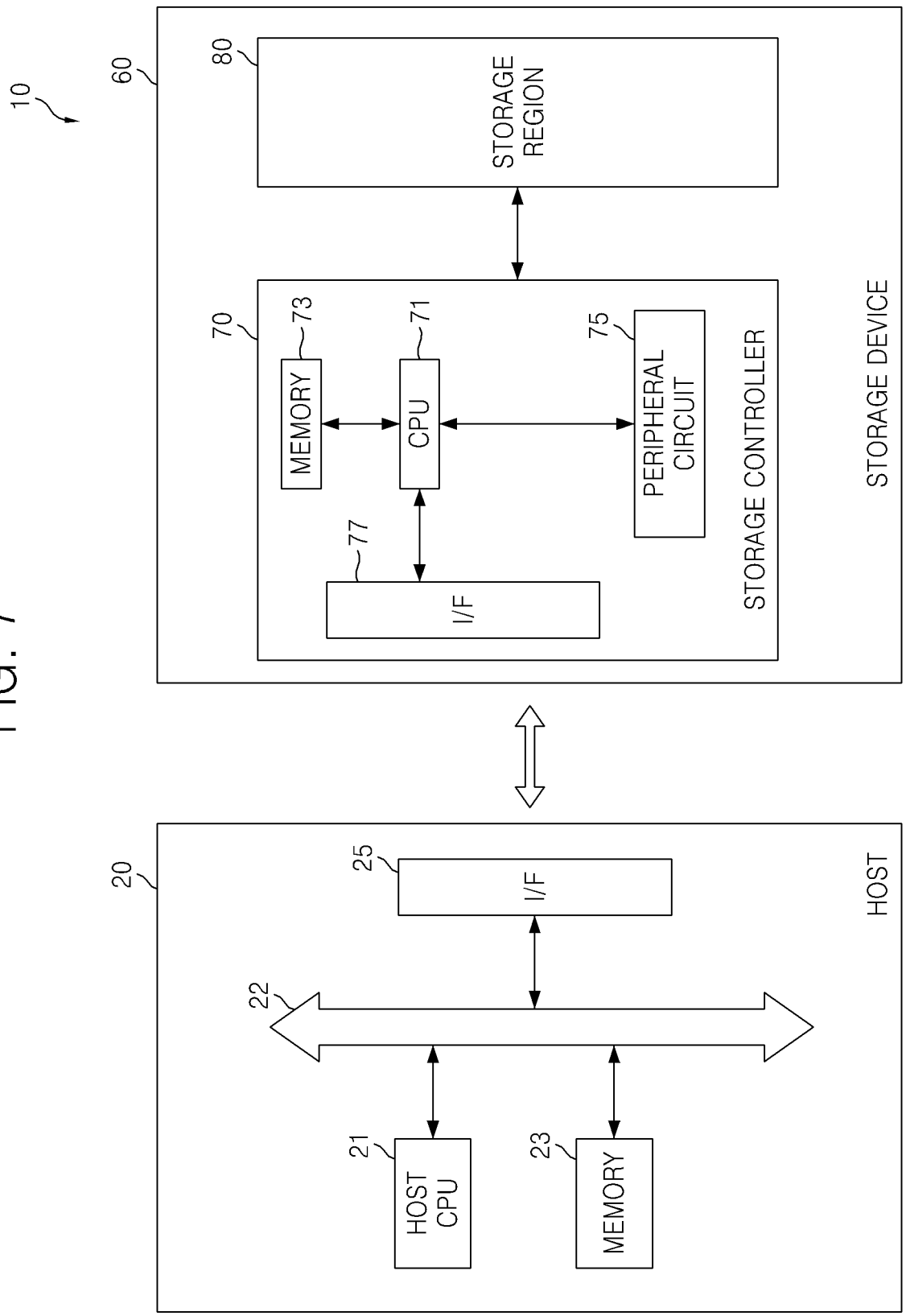
FIG. 7 is a block diagram of a data storage system including a host according to an embodiment of the inventive concept.

FIG. 7 is a block diagram of a storage system including a host operating in accordance with an embodiment of the inventive concept. Referring to FIGS. 1 to 7, the host 20 may be included in consumer equipment which processes and stores data. For example, the consumer equipment may be a hard disk drive HDD, a mobile phone, a smart phone, a personal digital assistant (PDA), a computer, e.g., a PC or a laptop computer, a navigator device, a home automatic system, a music player (MP3 player), a camcorder, an image player (DVIX player), a storage server or a portable multimedia player (PMP).

The host 20 includes a host CPU 21, a memory 23 and an interface 25. The host CPU 21 is connected to the memory 23 and the interface 25 by a bus 22.

The host CPU 21 may read a program code stored in the memory 23, e.g., a program code performing a file system management method according to an example embodiment of the present invention, execute it and perform the file system management method. The memory 23 may be embodied in a non-volatile memory or a volatile memory.

An address of a region, data and a write command operated by the host CPU 21 are transmitted to the storage device 60 through the interface 25. The storage device 60 includes the storage controller 70 and the storage region 80. The storage device 60 may be embodied in a memory card or a solid state drive (SSD). According to an example embodiment, the storage device 60 may be embedded in the host 20 or plugged as an external peripheral device.

The storage controller 70 includes a CPU 71, a memory 73, a peripheral circuit 75 and an interface 77. The CPU 71 controls the storage region 80 to store data in the storage region 80 in response to data and a write command received from the host 20 through the interface 77. The memory 73 stores the data and the write command received from the host 20 tentatively.

The peripheral circuit 75 includes all circuits necessary for writing data in the storage region 80. For example, when the storage region 80 is a hard disk drive, the peripheral circuit 75 includes all devices such as a spindle motor, a voice coil motor and a magnetic head, which are not illustrated.

The storage region 80 may be embodied in a hard disk drive, a read only memory (ROM), a programmable read only memory (PROM), an erasable programmable read only memory (EPROM), an electrically erasable programmable read only memory (EEPROM), a flash memory, a ferroelectrics random access memory (FRAM), a magnetic random access memory (MRAM), a phase change random access memory (PRAM), a nano random access memory (NRAM), a silicon-oxide-nitride-oxide-silicon (SONOS), a resistive memory or a racetrack memory.

Figure 8:
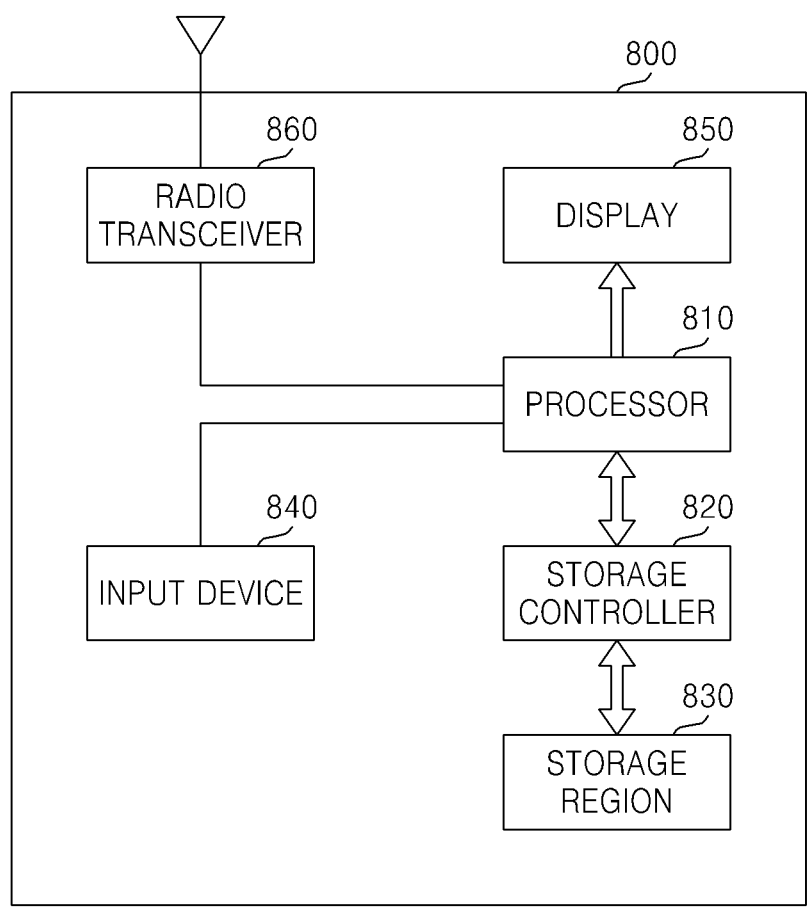
FIG. 8 is an electronic device including a host according to an embodiment of the inventive concept.

FIG. 8 illustrate an electronic device including a host according to another embodiment of the inventive concept. Referring to FIG. 8, an electronic device 800 which may be embodied in a cellular phone, a smart phone or a wireless internet device includes processor 810, a storage controller 820 controlling a storage region 830, and an input device 840.

The processor 810 receives a request of writing data input through the input device 840 by a user and performs a file system management method according to an example embodiment of the present invention.

The input device 840 is a device which may input control signals for controlling an operation of the processor 810 or data to be processed by the processor 810, and may be embodied in a pointing device such as a touch pad and a computer mouse, a keypad or a keyboard.

The processor 810 may transmit an address of a region where data are stored and a write command to the storage controller 820 by performing several operations. The storage region 830 writes the data in response to a control signal of the storage controller 820. Data stored in the storage region 830 may be displayed through a display 850 under a control of the processor 810.

A radio transceiver 860 may transmit or receive radio signals through an antenna. For example, the radio transceiver 860 may convert radio signals received through the antenna into signals that a processor 191 may process. Accordingly, the processor 810 may process signals output from the radio transceiver 860. It may store processed signals in the storage region 830 or display them through the display 850 through a file system management method according to an example embodiment of the present invention.

In addition, the radio transceiver 860 may convert signals output from the processor 810 into radio signals and output converted radio signals to outside through the antenna. The processor 810 may control an operation of the display 850 so that data output from the storage region 830, radio signals output from the radio transceiver 860 or data output from the input device 840 may be displayed through the display 850.

A file system management method in a host according to an example embodiment of the present invention and devices performing the method may improve performance of a storage system by classifying data into hot data or cold data using file meta information.

Although a few embodiments of the present general inventive concept have been shown and described, it will be appreciated by those skilled in the art that changes may be made in these embodiments without departing from the scope of the inventive concept, the scope of which is defined in the appended claims and their equivalents.

What is claimed is:

1. A method of operating a file system in a host configured to store write data in a data storage device including a first region and a second region, the method comprising:
   receiving a write data request for write data associated with a file;
   determining whether the write data request results in an update of the file or an appending of data to the file in accordance with the file meta data; and
   using file meta data for the file, either classifying the write data as hot data when the write data request results in the update to the file and then storing the write data in the first region, or classifying the data as cold data when the write request results in the appending of data to the file and then storing the write data in the second region.

2. The method of claim 1, wherein the file meta data includes at least one of a file offset and a file size.

3. The method of claim 1, further comprising:
   defining an address for the write data, at least on part, based on either the classifying of the write data as hot data or the classifying of the write data as cold data.

4. The method of claim 1, further comprising:
   further classifying the hot data as hot data or very hot data by referencing an update count value for the write data and comparing the update count value with a threshold value.

5. The method of claim 4, wherein the data storage device further includes a third region, and the method further comprises:

upon further classifying the write data as hot data storing the write data in the first region, and upon further classifying the write data as very hot data storing the write data in the third region.

6. The method of claim 1, further comprising:
further classifying the cold data as cold data or very cold data by referencing an update count value for the write data and comparing the update count value with a threshold value.

7. The method of claim 6, wherein the data storage device further includes a third region, and the method further comprises:
upon further classifying the write data as cold data storing the write data in the second region, and upon further classifying the write data as very cold data storing the write data in the third region.

8. The method of claim 1, wherein the file system is a log structured file system, and the first region and the second region respectively correspond to a first log and a second log.

9. In a data storage system comprising a host connected to a data storage device, the host comprises:
a user application generating a write data request to write data associated with a file to the data storage device; and
a file system configured to receive the write data request, determine whether the write data request results in an update to the file or an appending of data to the file in accordance with the file meta data, and using file meta data for the file, either classifying the write data as hot data when the write data request results in the update to the file and then storing the write data in the first region, or classifying the data as cold data when the write request results in the appending of data to the file and then storing the write data in the second region.

10. The host of claim 9, wherein the file meta data includes at least one of a file offset and a file size.

11. The host of claim 9, further comprising:
a host driver configured to define an address for the write data, at least on part, based on either the classifying of the write data as hot data or the classifying of the write data as cold data.

12. The host of claim 9, wherein the file system is further configured to further classify the hot data as hot data or very hot data by referencing an update count value for the write data and comparing the update count value with a threshold value.

13. The host of claim 12, wherein the data storage device further includes a third region and the file system is further configured to store the very hot data in the third region.

14. The host of claim 9, wherein the file system is a log structured file system, and the first region and the second region respectively correspond to a first log and a second log.

15. A memory system, comprising:
a data storage device including a first region and a second region; and
a host connected to the data storage device, wherein the host comprises;
a user application generating a write data request to write data associated with a file; and
a file system configured to receive the write data request, determine whether the write data request results in an update to the file or an appending of data to the file in accordance with the file meta data, and using file meta data for the file, either classifying the write data as hot data when the write data request results in the update to the file and then storing the write data in the first region, or classifying the data as cold data when the write request results in the appending of data to the file and then storing the write data in the second region.

16. The system of claim 15, wherein the file meta data includes at least one of a file offset and a file size.

17. The system of claim 15, wherein the host further comprises:
a host driver configured to define an address for the write data, at least in part, based on either the classifying of the write data as hot data or the classifying of the write data as cold data.

18. The method of claim 1, wherein the data storage device is one of a memory card and a solid state drive (SSD).

19. The data storage system of claim 9, wherein the data storage device is one of a memory card and a solid state drive (SSD).

20. The system of claim 15, wherein the data storage device is one of a memory card and a solid state drive (SSD).

* * * * *